United States Patent [19]

Young et al.

[11] Patent Number: 4,710,899

[45] Date of Patent: Dec. 1, 1987

[54] DATA STORAGE MEDIUM INCORPORATING A TRANSITION METAL FOR INCREASED SWITCHING SPEED

[75] Inventors: Rosa Young, Troy; Stanford R. Ovshinsky, Bloomfield Hills, both of Mich.

[73] Assignee: Energy Conversion Devices, Inc., Troy, Mich.

[21] Appl. No.: 742,813

[22] Filed: Jun. 10, 1985

[51] Int. Cl.$^4$ .............................................. G11C 13/00
[52] U.S. Cl. .................................. 365/113; 346/135.1; 346/137; 430/945; 357/2; 369/283
[58] Field of Search ............... 365/113, 163, 106, 215; 346/76 L, 135.1, 137; 369/283, 286; 430/495, 945; 357/2

[56] References Cited

U.S. PATENT DOCUMENTS

| | | | |
|---|---|---|---|
| 3,868,651 | 2/1975 | Ovshinsky | 357/2 |
| 3,988,720 | 10/1976 | Ovshinsky | 357/2 |
| 4,461,807 | 7/1984 | Mori et al. | 346/76 L |
| 4,499,178 | 2/1985 | Wada et al. | 430/945 |
| 4,637,976 | 1/1987 | Terao et al. | 430/945 |

*Primary Examiner*—Stuart N. Hecker
*Assistant Examiner*—Glenn A. Gossage
*Attorney, Agent, or Firm*—Richard M. Goldman; Marvin S. Siskind; Lawrence G. Norris

[57] ABSTRACT

A data storage medium which includes a transition metal as a switching modulator is disclosed. The data storage medium is switchable by projected beam energy, has an erased signal to noise ratio that is substantially invariant with respect to written storage time, and a contrast ratio that is substantially invariant with respect to cycle history. The data storage medium is substantially oxygen free and comprises a chalcogenide and a switching modulator. The switching modulator is a transition metal, especially from the right hand column of Group VIII, e.g. nickel (Ni), palladium (Pd), and platinum (Pt). The concentration of the switching modulator in the data storage medium is high enough to suppress grain growth during written storage, to provide random crystallite orientation and to increase the erase velocity, but low enough to permit discrimination between detectable written and erased states of the data storage medium.

2 Claims, 9 Drawing Figures

DATA STORAGE MEDIUM INCORPORATING A TRANSITION METAL FOR INCREASED SWITCHING SPEED

ART TO WHICH INVENTION RELATES

The invention disclosed herein relates to optical data storage devices where data is stored in a material, e.g. a state changeable material, that is reversibly switchable between two detectable states by the application of projected beam energy thereto.

BACKGROUND OF THE INVENTION

Non ablative, state changeable, optical data storage systems record information in a state changeable material that is switchable between at least two detectable states by the application of energy thereto, for example, the application of projected beam energy such as optical energy, particle beam energy, or the like.

The state changeable optical data storage material is present in an optical data storage device having a structure such that the data storage material is supported by a substrate and encapsulated in encapsulants. In the case of an optical data storage device, the encapsulants may include anti-ablation materials and layers, thermal insulating materials and layers, anti-reflection layers between the projected beam source and the data storage medium, reflective layers between the optical data storage medium and the substrate, and the like. Various layers may perform more than one of these functions. For example, the anti-reflection layers may also be thermal insulating layers. The thicknesses of the layers, including the layer of state changeable data storage material, are optimized whereby to minimize the energy necessary for state change while retaining the high contrast ratio, high signal to noise ratio, and high stability of the state changeable data storage material.

The state changeable material is a material capable of being switched from one detectable state to another detectable state by the application of projected beam energy thereto. State changeable materials are such that the detectable states may differ in their morphology, surface topography, relative degree of order, relative degree of disorder, electrical properties, optical properties, and combinations of these properties. The state of the state changeable material is detectable by the electrical conductivity, electrical resistivity, optical transmissivity, optical absorbtion, optical reflectivity and any combination thereof.

In the case of optical data storage materials, the optical data storage material is typically deposited as a disordered material and formed or initialized to a system having (1) relatively reproducible, erased or "0", relatively ordered or even crystalline properties, (2) relatively reproducible written, binary "1", relatively disordered or even amorphous detectable properties, preferably with (3) a relatively high degree of history invariant discrimination therebetween for a high number of write-erase cycles, i.e. for a relatively high number of vitrify-crystallize cycles, (4) a relatively high crystallization velocity; and (5) a relatively high degree of thermal stability in both states.

Deposition may be by evaporative deposition, chemical vapor deposition, or plasma deposition. As used herein plasma deposition includes sputtering, glow discharge, and plasma assisted chemical vapor deposition. In many cases, the resulting as deposited disordered material must be initialized as described, for example, in the commonly assigned copending application of Rosa Young and Napoleon Formigoni for *Method Of Forming An Optical Data Storage Device* Ser. No. 769,227, filed Aug. 26, 1985, a continuation-in-part of commonly assigned, copending U.S. application Ser. No. 667,294, filed Nov. 1, 1984, and now abandoned. That is, the memory must be conditioned, formed, initialized, or otherwise prepared to receive data if the data is going to be recorded in a disordered (binary "1") state. Initialization, i.e. formation, requires the conversion of the phase changeable data storage material from the as deposited disordered or ordered state to a stable system switchable between a vitrified, disordered, written state corresponding to binary 1 and an ordered "erased", crystallized state corresponding to binary "0" with history invariant cycling properties.

Tellurium based materials have been utilized as phase changeable memory materials. This effect is described, for example, in J. Feinleib, J. deNeufville, S. C. Moss, and S. R. Ovshinsky, "Rapid Reversible Light-Induced Crystallization of Amorphous Semiconductors", *Appl. Phys. Lett.*, Vol. 18 (6), pages 254–257 (Mar. 15, 1971), in J. Feinleib, S. Iwasa, S. C. Moss, J. P. deNeufville, and S. R. Ovshinsky, "Reversible Optical Effects In Amorphous Semiconductors", Journal of Non-Crystalline Solids, Vol. 8–10, pages 909–916 (1972), and in U.S. Pat. No. 3,530,441 to S. R. Ovshinsky for *Method and Apparatus For Storing And Retrieving Of Information*. A recent description of tellurium-germanium-tin systems, without oxygen, is in M. Chen, K. A. Rubin, V. Marrello, U. G. Gerber, and V. B. Jipson, "Reversibility And Stability of Tellurium Alloys for Optical Data Storage," *Appl. Phys. Lett.*, Vol. 46 (8), pages 734–736 (Apr. 15, 1985).

Tellurium based state changeable materials, in general, are multiphase systems (1) where the ordering phenomena includes nucleation and growth processes (both homogeneous and heterogeneous) to convert a system of disordered materials to a system of ordered and disordered materials, and (2) where the vitrification phenomena includes melting and rapid solidification of the phase changeable material to transform a system of disordered and ordered components to a system of disordered components. The above phase changes and separations occur over relatively small distances with intimate interlocking of the phases and gross structural discrimination.

The major limitation of using state change materials for optical data storage is the trade off between thermal stability and the crystallization rate. Another limitation is the cycle history dependency of the contrast ratio as interfacial interactions occur between phase changeable materials. A more subtle limitation is the observed increase in the "erased" signal to noise ratio with respect to time in the written state prior to erasure. Reflectivity is a function of crystallite orientation. The "erased" signal to noise ratio increases as certain preferred nucleations initiate and/or nucleation site rearrangements occur during room temperature storage.

SUMMARY OF THE INVENTION

The problems of (a) slow erase times, i.e. slow crystallization rates, (b) the loss of "erased" signal to noise ratio invariance as a function of "written" storage times, and (c) the loss of cycle history invariance as the number of cycles reaches large numbers are obviated by the composition, method, and apparatus of the present invention.

As herein contemplated, there is provided a projected beam data storage device having a memory material, i.e., a data storage medium, switchable between detectable states by the application of projected beam energy thereto. The data storage medium has an "erased" state signal to noise ratio that is substantially invariant with respect to storage time. "Storage time" is the time spent in a prior "written" state. The data storage medium has a contrast ratio that is substantially invariant with respect to cycle history. "Cycle history" includes either the number of cycles, or the time in each state, or both. The data storage medium has a fast erase, i.e., a fast crystallization rate, e.g. on the order of less than 1 microsecond. The contemplated data storage medium comprises a chalcogenide or chalcogenides and a switching modulator, and may also include a cross linking agent or agents.

While not necessary to the practice of the invention, it is believed that the switching modulator is an effective nucleation sites in the written state, to provide a large volume fraction of small crystallites and random crystallite orientation in the erased state. This serves to enhance the crystallization rate and permit discrimination between relatively ordered and relatively disordered states, to provide a relatively invariant "erased" signal to noise ratio with respect to time in the previous "written" state.

The switching modulator is believed to work by providing nucleation sites, e.g., by introducing impurity states or bands into the chalcogenide phase electronic structure, thereby forming locally electrically active centers in the chalcogenide phase, which localized electrically active sites may act as nucleation sites. Alternatively, or additionally, the switching modulator may act as a crystal growth promoter, terminating disordered chalcogenide chains.

The switching modulator is a transition metal or a halogen. Preferred are the transition metals of the right column of Group VIII, Ni, Pd, Pt, and mixtures thereof, with Ni preferred. The switching modulator is present in the composition at a concentration of from about 0.1 to 20 atomic percent, and preferably from about 1 to 10 atomic percent. Additionally, a halogen, such as F, Cl, Br, I, or mixtures thereof may be present, e.g. with the transition metal, as a switching modulator. Iodine is the preferred halogen switching modulator.

Exemplary chalcogenide compositions include tellurium, for example, where the tellurium is present with a cross linking agent or agents. Thus, the chalcogenide composition is reversibly switchable between (1) an amorphous, first tellurium-cross linking agent composition and (2) crystalline tellurium, possibly locally precipitated in the presence of an amorphous, second-tellurium-cross linking agent composition.

Suitable cross linking agents are elements of Groups IIIB, IVB, and VB, of the Periodic Table. These include Al, In, and Ga from Group IIIB, Si, Ge, and Sn from Group IVB, N, P, As, Sb, and Bi from Group VB, as well as combinations thereof. Exemplary cross linking agents from Groups IIIB, IVB, and VB, of the Periodic Table include silicon, germanium, tin, arsenic, antimony, and mixtures thereof, especially silicon and/or germanium, either alone or with one or more of tin, arsenic, or antimony. Especially preferred is Ge. Additionally, further light chalcogenides, as Se and S, may be present.

Exemplary chalcogenide compositions include the chalcogenide, e.g., tellurium, the switching modulator, and a cross linking agent, e.g., silicon and/or germanium, or silicon and/or germanium with another cross linking agent in an amount sufficient to form a stable disordered chalcogenide. Generally the atomic ratio of the cross linking agents to total composition is from about 1 percent to about 20 percent.

The atomic fraction of the switching modulator is from 0.1 to 20 atomic percent, and preferably 1 to 10 atomic percent.

The data storage medium may be formed by depositing the materials to form a substantially uniform deposit thereof. The deposit may be from about 500 to about 1500 angstroms thick. The deposit may be formed as a single layer, or as multiple layers, e.g., of chalcogenide about 200 to 300 Angstroms thick, and of dielectric, as $GeO_2$, $SiO_2$, $Al_2O_3$ or the like, about 50 to 100 Angstroms thick.

The data storage medium may be deposited by various means including sputtering, such as cosputtering, reactive sputtering, reactive cosputtering, evaporating, or coevaporating.

After deposition, a series of vitrification or crystallization and vitrification steps may be carried out whereby to effect "initialization" to a uniform "erased" state.

THE FIGURES

The invention may be particularly understood by reference to the Figures appended hereto.

Figure 3:
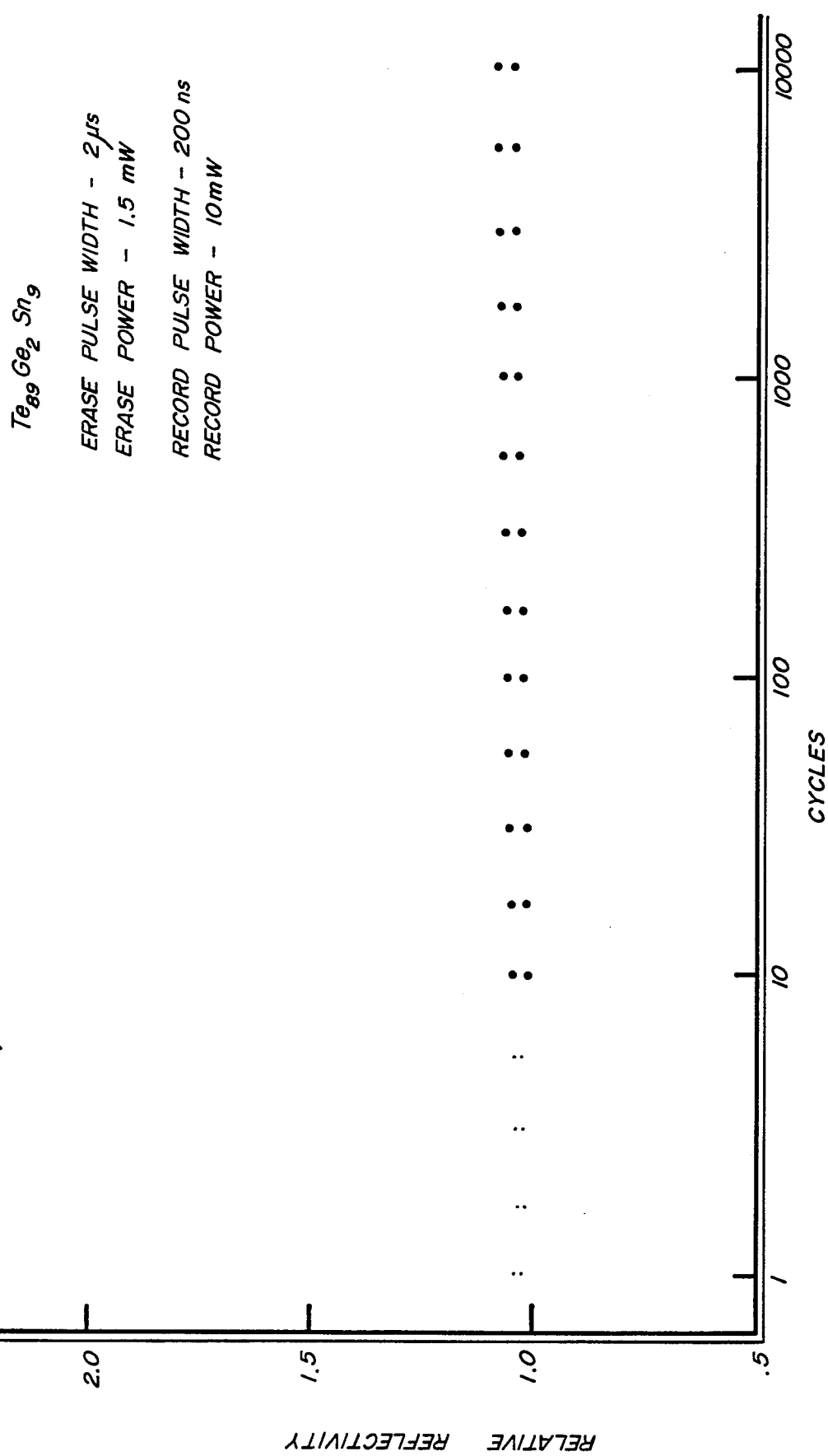
Figure 4:
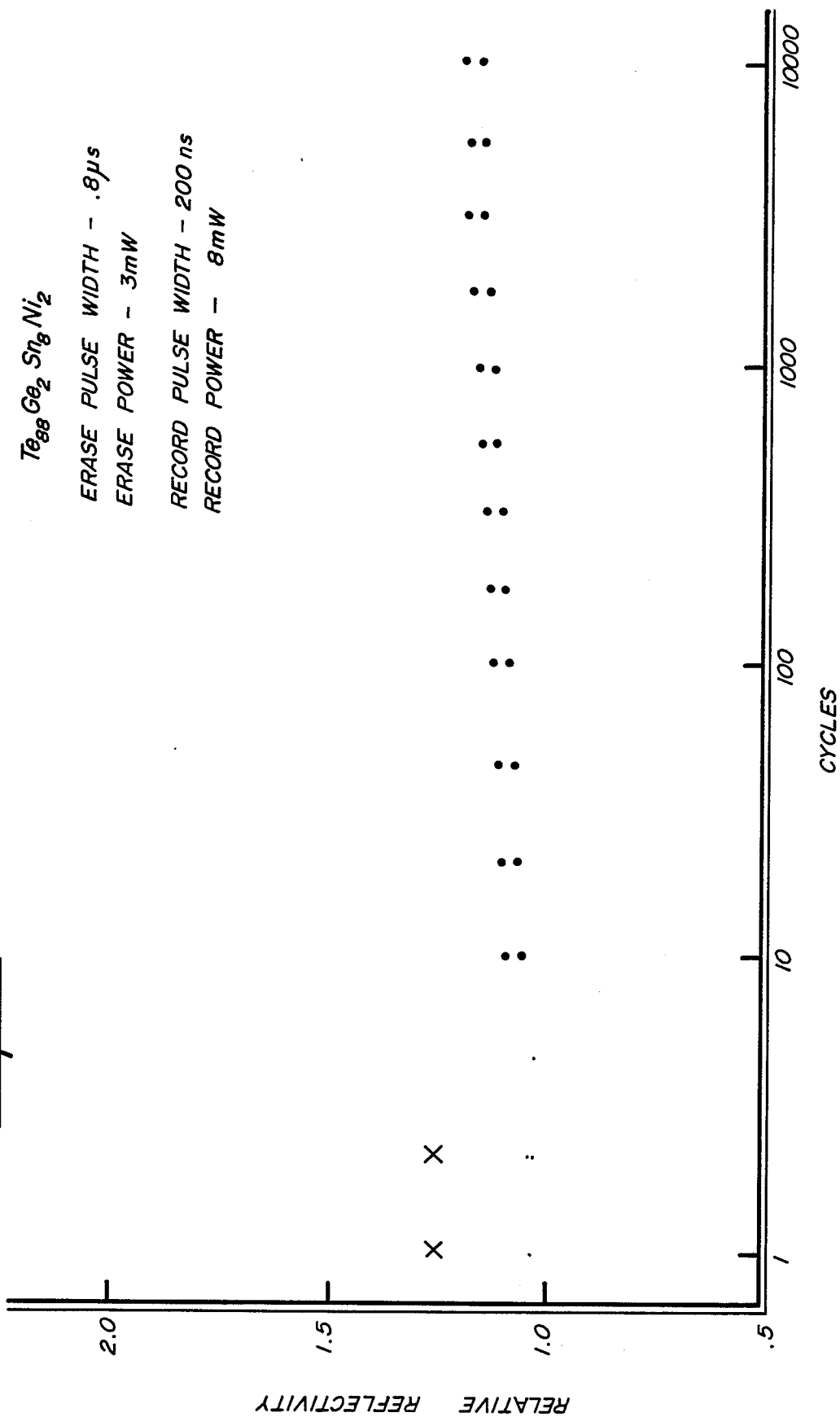
Figure 5:
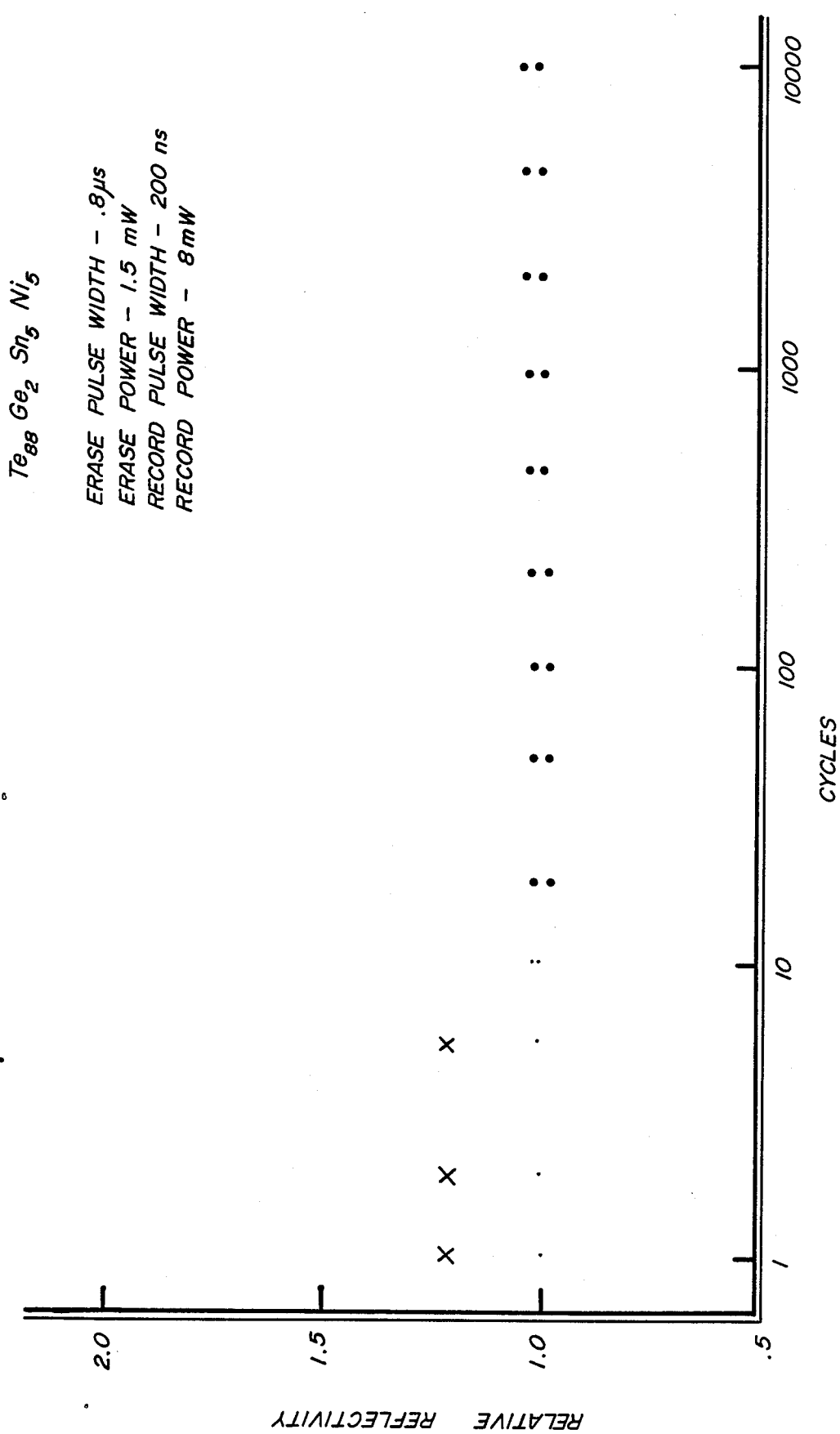

FIGS. 3, 4, and 5 are plots of written and erased state relative reflectivities and switching times versus number of cycles at various Ni contents for $Te_{88}Ge_2Sn_5Ni_5$ $Te_{88}Ge_5Sn_5Ni_2$, and $Te_{89}Ge_2Sn_9$.

Figure 6:
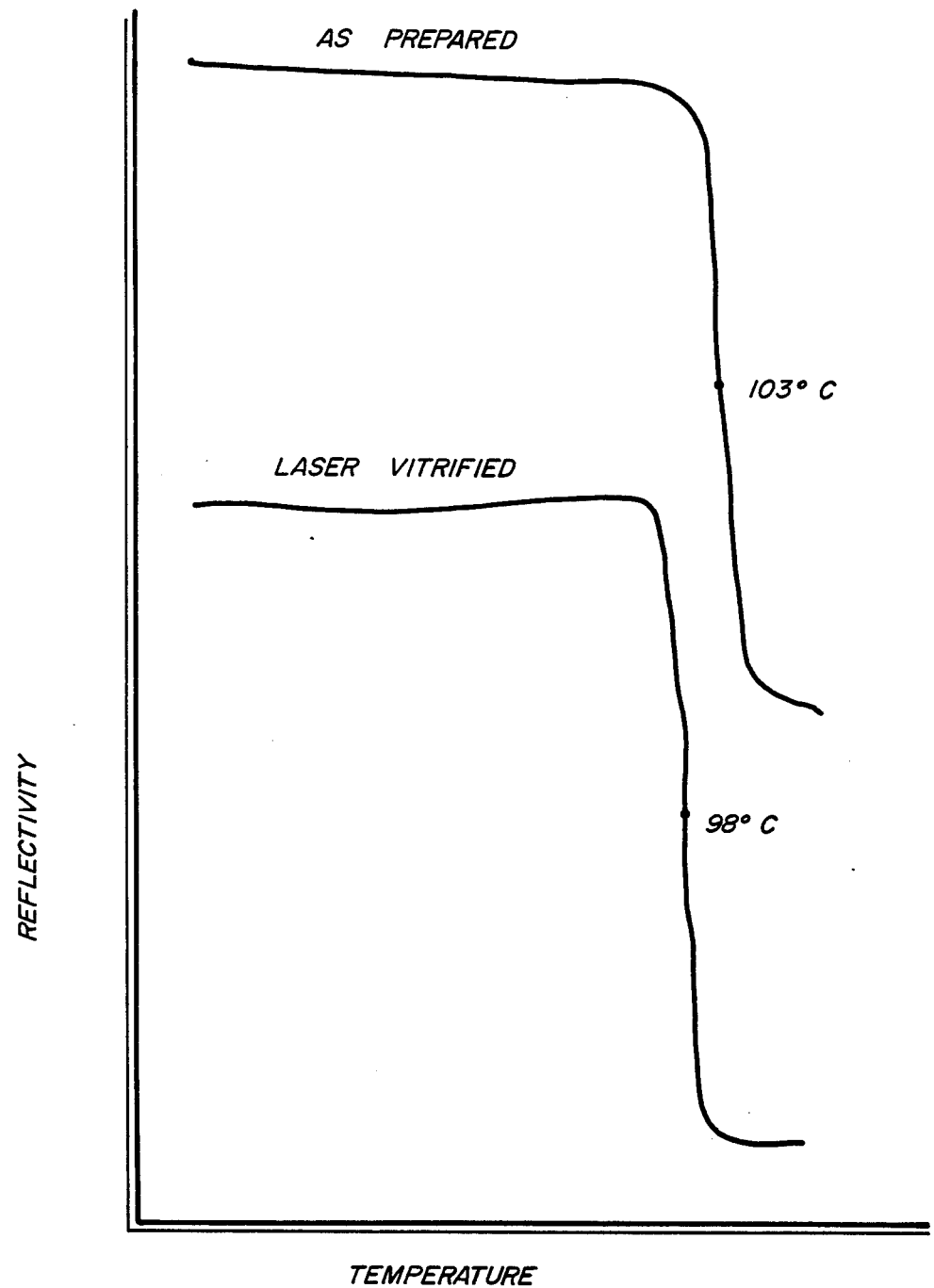
Figure 7:
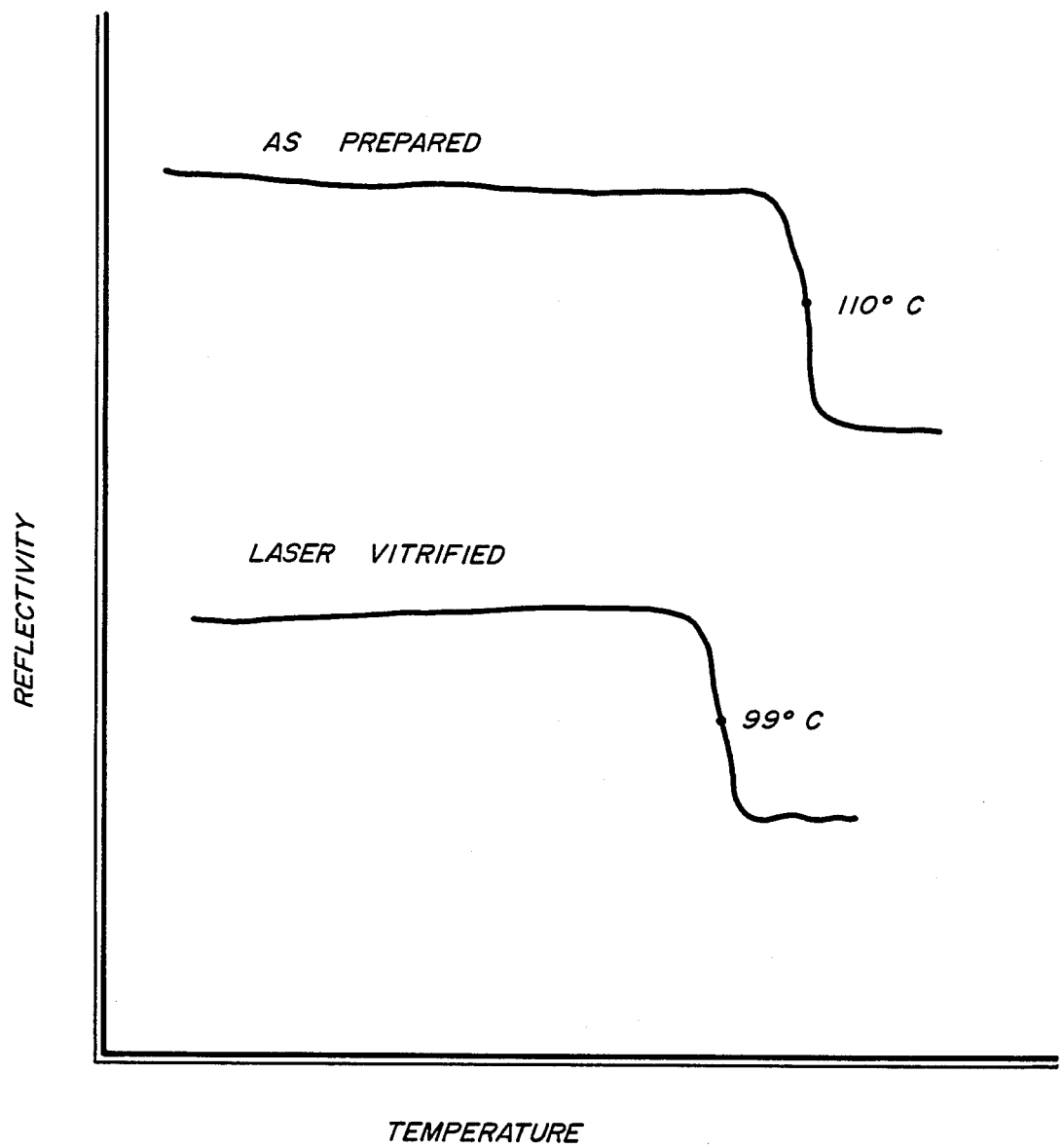
Figure 8:
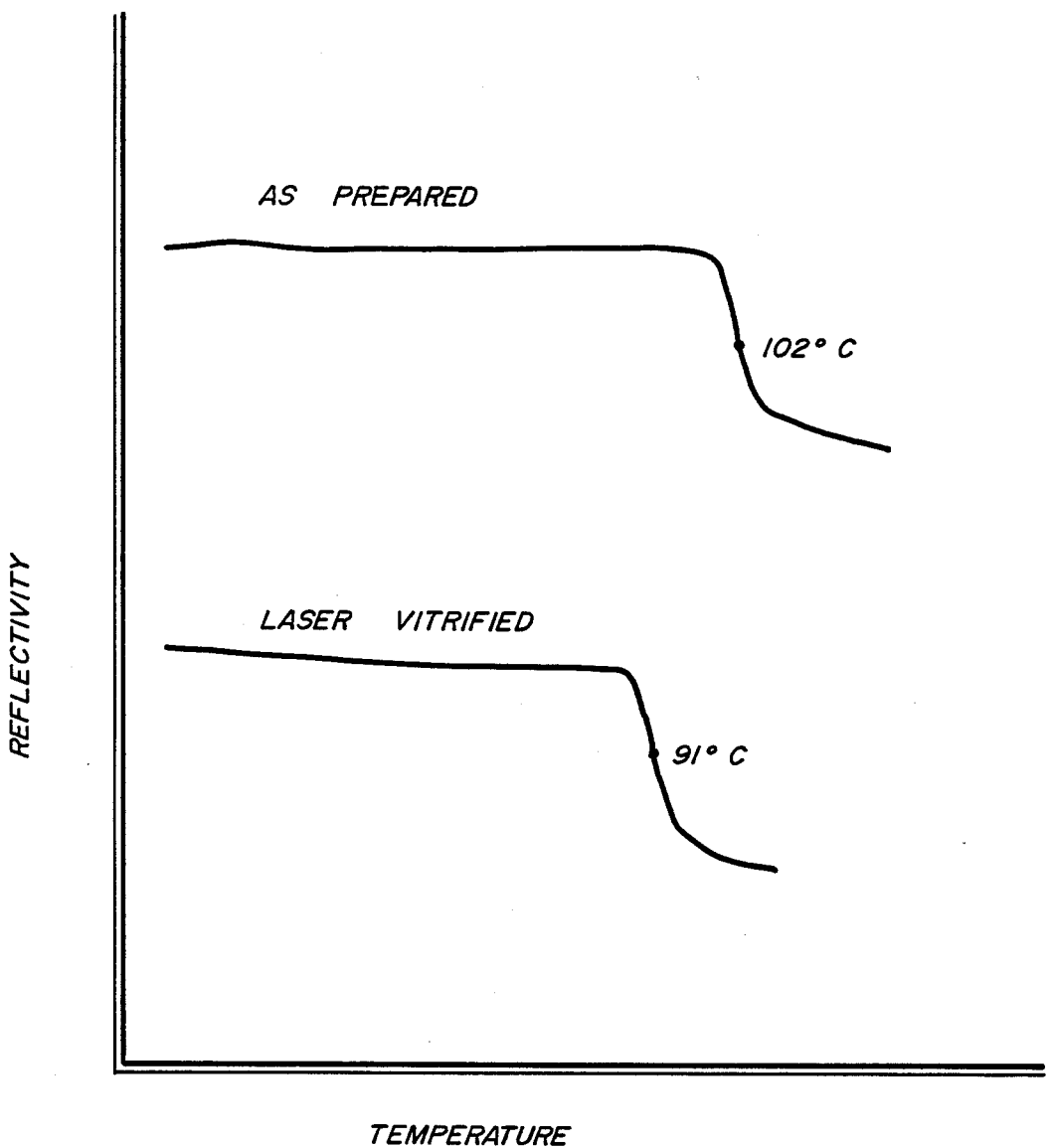

FIGS. 6, 7, and 8 are plots of reflectivity versus temperature for $Te_{88}Ge_2Sn_5$, $Te_{88}Ge_5Sn_5Ni_2$, and $Te_{89}Ge_2Sn_9$.

DETAILED DESCRIPTION OF THE INVENTION

According to the invention described herein, there is provided a projected beam data storage device having a data storage medium switchable between detectable states by the application of projected beam energy thereto.

Figure 1:
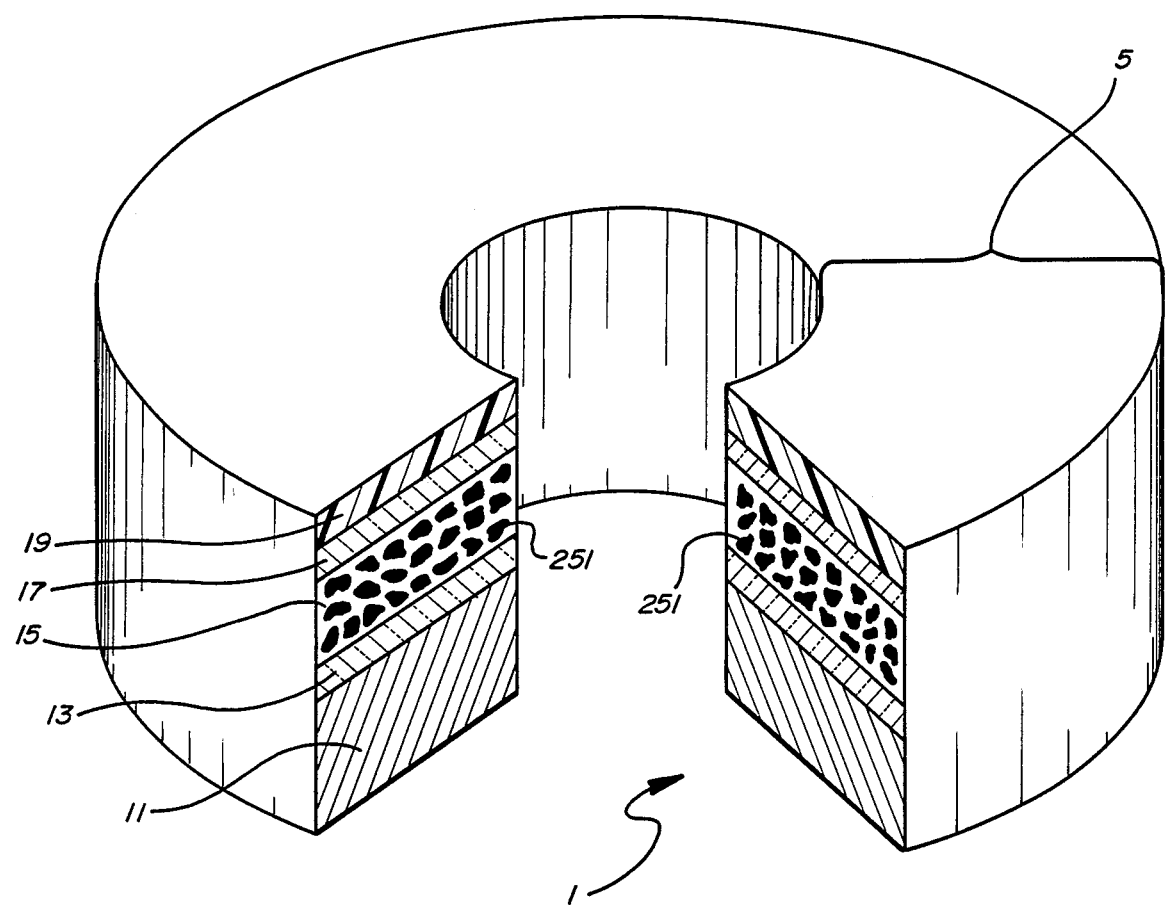
FIG. 1 is a partial cut-away isometric view, not to scale with exagerated latitudinal dimensions and vertical scale, of an optical data storage device.

FIG. 1 shows a projected beam data storage device 1 having a memory region 5. Within the memory region, shown in partial cut-away, is a substrate 11. Deposited on the substrate 11 is a thermal insulating and reflective layer 13. Atop the thermal insulating and reflective layer 13 is the memory layer 15. Above the memory layer 15 is an anti-ablation layer 17 and a protective layer 19. Most commonly, the protective layer will be a substantially transparent plastic layer.

The phase change material within the individual cells 251 of the dispersed, switchable material is typically a chalcogenide composition, containing a chalcogenide, a cross linking agent, and a switching modulator, with or without oxygen. Optionally, other light chalcogenides, as S or Se, may be present.

The switching modulator is a transition metal, optionally with a halogen. The preferred switching modulators are the transition metals of the right hand column of Group VIII, Ni, Pd, and Pt. The halogen, when present, may be F, Cl, Br, or I, with Br and I preferred.

The cross linking agents are elements of Groups IIIB, IVB, and VB, of the periodic chart.

Exemplary cross linking agents from Groups IIIB, IVB, and Vb, include Al, In, and Ga from Group IIIB, Si, Ge, and Sn from Group IVB, N, P, As, Sb, and Bi from Group VB, and mixtures thereof. Most commonly, the cross linking agent is Ge or Si, with one or more of Sn, As, or Sb.

Additionally, the data storage medium chalcogenide composition may contain one or more additional chalcogenides such as sulfur, selenium, or mixtures thereof as well as further cross linking agents such as tin, arsenic, or antimony and contrast enhancing additives such as gallium, or tin, and the like.

In one preferred exemplification, the data storage medium is substantially free of oxygen, the chalcogenide is tellurium, the cross linking agent is germanium either alone or with additional cross linking agents, e.g., silicon, tin, arsenic, and/or antimony, the switching modulator is nickel, the atomic ratio of cross-linking agent(s) to total composition is from about 1 percent to about 20 percent, the atomic fraction of switching modulator is from 1 to 20 percent and preferably from 1 to 10 percent. Additionally, the data storge medium may further contain contrast enhancing additives, such as tin with a ratio of contrast enhancing additive to total composition of from about 2 percent to about 10 percent.

The amounts of switching modulator and cross linking agent individually, and the total amounts of switching modulator and cross linking agent are relatively critical for (1) enhancing the crystallization rate, (2) obtaining an optimum "erase" signal to noise ratio invariance with respect to "written" storage time and random crystallite orientation, (3) obtaining an optimum contrast ratio with respect to cycle history, (4) achieving crystallite growth suppression in the written state, and (5) enhancing discrimination between "erased" and "written" states.

According to the invention herein contemplated, the atomic fraction of switching modulator should be high enough to obtain a high density of nucleation sites, i.e. above about 0.1 atomic percent and preferably above 2 atomic percent. This controls grain size and provides random crystallite orientation in the erased state. However, the concentration of switching modulator should be below about 20 atomic percent and preferably below about 10 atomic percent to permit discrimination between detectable states. The effect of switching modulator above an effective threshold is evidenced by an increase in crystallization velocity and by one or more of (a) a reduction in "erased" signal to noise ratio as a function of "written" storage time, (b) a decrease in grain size as determined by Raman spectroscopy, and/or (c) a decrease in the preferred orientation of the grains, as evidenced by x-ray diffraction.

We have found that both (1) written state storage stability and (2) randomness of subsequent erased state chalcogenide crystallization are harmfully effected by oxygen content. The comparative effects of oxygen and nickel as a switching modulator on (1) written state storage stability and (2) randomness of subsequent erased state chalcogenide crystallization, are shown in FIGS. 2A and 2B.

Figures 2A, 2B:
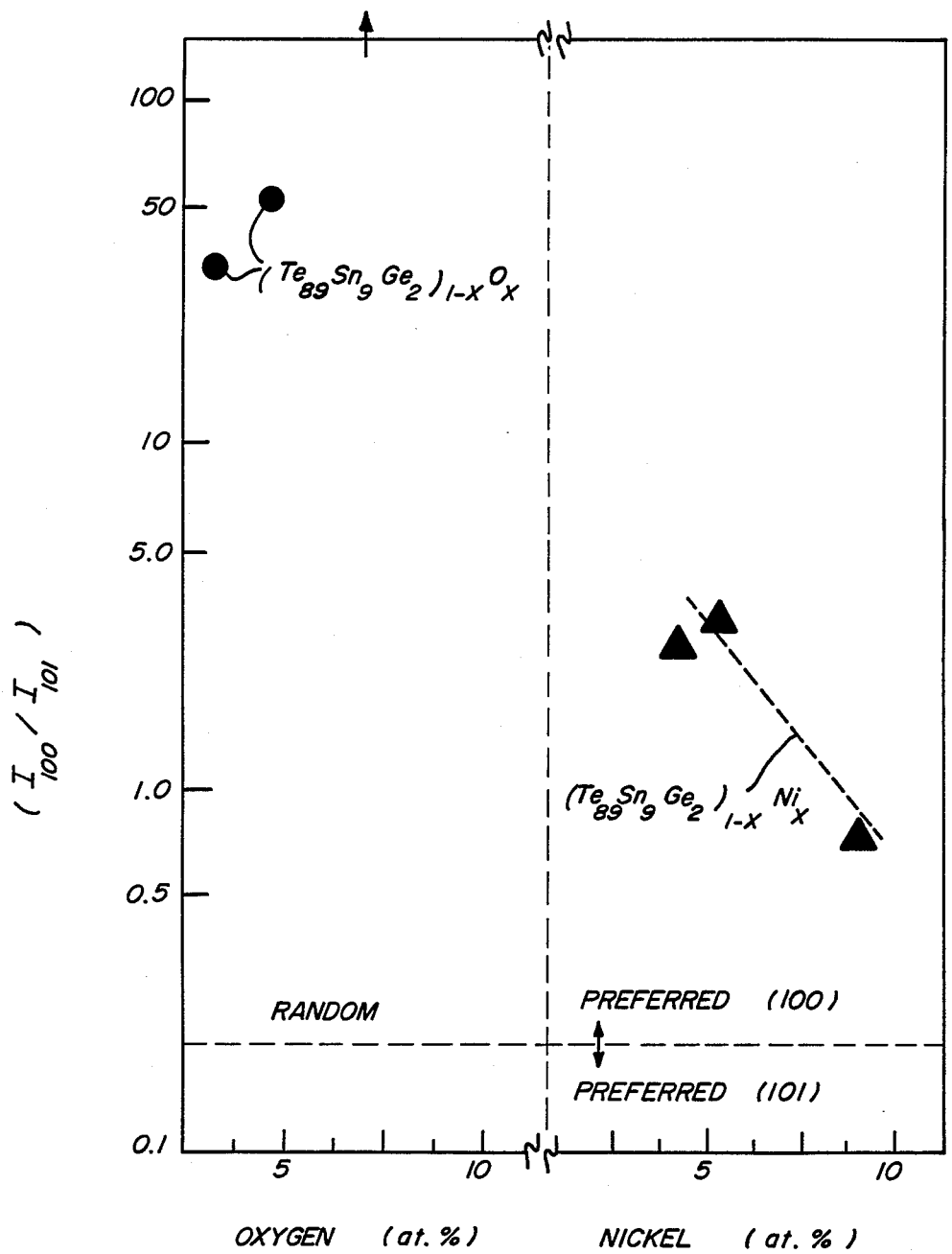
FIGS. 2A and 2B are plots of a measure of erased state chalcogenide crystallite orientation as functions of (1) nickel or oxygen content, and (2) written state storage time.

In FIG. 2A and 2B, the logarithm of the ratio of (1) the intensity of 100 oriented "erased" chalcogenide crystallites to (2) the intensity of the 101 oriented "erased" chalcogenide crystallites determined by x-ray diffraction is plotted as a function of (3) oxygen and/or nickel content, and (4) written state storage time. The change in crystal orientation upon storage is correlated with poor written state storage stability and high erased state signal to noise ratios, while crystallite randomness is correlated with good written state storage stability and low erased state signal to noise ratios. Orientation intensity ratios of 0.1 to 1.0, and especially about 0.2, are preferred.

The nickel containing films were co-sputtered from ($Te_{89}Ge_2Sn_9$) and Ni targets. The oxygen containing samples were reactively sputtered from ($Te_{89}Ge_2Sn_9$) targets in an Ar-He atmosphere. After sputtering, the resulting films were cycled through large area vitrification-crystallization cycles, i.e., "write"–"erase" cycles, for x-ray diffraction studies. Vitrification, i.e., recording, was by a 30–40 milliwatt, 35 nanosecond laser pulse over a 1 cm by 1 cm area. Crystallization, i.e., erasing, was by a 0.5 Joule/$cm^2$, 50 microsecond pulse from a Xe flash tube, over a 1 cm by 1 cm area. X-ray defraction studies were done after crystallization, i.e., "erasing".

The ($Te_{89}Ge_2Sn_9$)$_{1-x}$O$_x$ samples, where x is from 0 to 0.20, shown in FIGS. 2A, exhibit increasing chalcogenide crystallite orientation with increasing oxygen content, and increasing chalcogenide crystallite orientation with increasing written state storage time.

The ($Te_{89}Ge_2Sn_9$)$_{1-x}$Ni$_x$ samples, shown in FIG. 2B, exhibit decreasing chalcogenide crystallite orientation with increasing Ni, and independence of chalcogenide crystallite orientation with respect to written state storage time. Nickel decreased chalcogenide crystallite orientations, that is, nickel increased randomness of the chalcogenide crystallites upon erasure.

FIGS. 3, 4, and 5 are plots of the written and erased state relative reflectivities and switching times versus number of cycles at various Ni concentration for co-sputtered $Te_{89}Ge_2Sn_9$ targets onto a 1 cm by 1 cm by 11 mil glass substrate in an argon atmosphere. The $Te_{89}Ge_2Sn_9$ samples were sputtered onto the targets in an argon atmosphere.

The samples were then tested in a state tester where a 1 micron by 1 micron cell was cycled repeatedly.

FIG. 3 shows the relative reflectivities for the written and erased states of a $Te_{89}Sn_9Ge_2$ cell over 10,000 cycles. Erasing was with a 2 microsecond, 1.5 milliwatt pulse, and writing was with a 200 nanosecond, 10 milliwatt pulse. FIG. 4 shows the relative reflectivities for the written and erased states of a $Te_{88}Ge_2Sn_8Ni_2$ cell over 10,000 cycles. Erasing was with a 0.8 microsecond, 3 milliwatt pulse, and writing was with a 200 nanosecond, 8 milliwatt pulse. FIG. 5 shows the relative reflectivities for the written and erased states of a $T_{88}Ge_2Sn_5Ni_5$ cell over 10,000 cycles. Erasing was with a 0.8 nanosecond, 1.5 milliwatt pulse, and writing was with a 200 nanosecond, 8 milliwatt pulse.

FIGS. 6, 7, and 8 show the reflectivity versus temperature for sputtered Te-Ge-Sn films, with and without Ni, before and after laser vitrification. The discontinuity represents the crystallization temperature. The films were prepared by co-sputtering Te-Ge-Sn and Ni in an argon atmosphere. The reflectivity versus temperature curve for the first crystallization is shown as the "As Prepared" curve. Vitrification was carried out with a series of "write" and "erase" cycles until constant values of written and erased reflectivity were obtained. The reflectivity versus temperature curve, after constant reflectivity values were obtained, is shown as the "Laser Vitrified" curve.

FIG. 6 shows a 103° C. crystallization temperature for $Te_{89}Ge_2Sn_9$ as deposited, and a 98° C. crystallization temperature as vitrified. This is a five degree difference. FIG. 7 shows a 110° C. crystallization temperature as vitrified. This is an eleven degree difference. FIG. 8 shows a 102° C. crystallization temperature for $Te_{88}Ge_2Sn_8Ni_5$ as deposited, and a 91° C. crystallization temperature as vitrified. This is also an eleven degree difference.

The elimination of oxygen, and the use of the contemplated switching modulator, e.g., a transition metal and/or a halogen, as nickel, platinum, palladium, bromine, iodine, or mixtures thereof, is associated with greatly enhanced written state (disordered) storage time for the erased state (crystalline) signal to noise ratio, and in a preferred exemplification, a substantially written state storage time invariant erase state signal to noise ratio.

Exemplary data storage medium formulations include, by way of example and not limitation, TeGeSnNi, TeSiSnNi, TeGeAlNi, TeGeNi, TeSeINi, and TeGeMoNi among others.

According to one exemplification, the materials are deposited or codeposited, e.g. by evaporation, coevaporation, reactive sputtering, or reactive cosputtering, to form a substantially uniform deposit thereof. Evaporation includes electron beam evaporation and thermal evaporation. The resulting coating is about 500 to 1500 or more angstroms thick, the exact thickness being experimentally determined to optimize contrast at the laser wavelengths of interest.

Encapsulation may be carried out under vacuum. In this way the data storage medium is not contacted with atmospheric oxygen.

Formation, i.e., stabilized phase separation, may be carried out either inside or outside the deposition chamber, or after deposition of the film, or after deposition of each layer of insulation, anti-ablation, and protective layers. In addition to the phase separation, formation also provides the advantage of release of the trapped argon in the film if the film is made by argon sputtering.

The following examples are illustrative of the method and apparatus of the invention.

EXAMPLES

EXAMPLE I

A series of tests were conducted to determine the relative effects of oxygen and nickel on (1) erased chalcogenide crystallite orientation, and (2) written state storage time.

For each test targets of $(Te_{89}Ge_2Sn_9)$ and Ni were utilized. For the Ni containing samples, the targets were co-sputtered onto a 1 inch by 1 inch by 11 mil glass substrate. For the oxygen containing samples, the $Te_{89}Ge_2Sn_9$ was reactively sputtered in an oxygen-argon atmosphere onto a 1 inch by 1 inch by 11 mil glass substrate. Sputtering was carried out in an R. D. Mathis sputtering module that was 3.75 inches from the sputtering target. The sputtering module had an SG-1250 power supply with a 13.56 megahertz oprating frequency through two radio frequency electrodes.

The sputtering module was taken down to $10^{-6}$ atmosphere and then pressurized to 3-5 millitorr with argon or argon and oxygen. Sputtering was then carried out for 15 minutes at a bias of 800 volts and an r.f. target power density of 0.5 watts/cm². Sputtering from the $(Te_{84}Ge_2Sn_9)$ and Ni targets was carried out in an argon atmosphere. Reactive sputtering from the $(Te_{89}Ge_2Sn_9)$ target was carried out in an argon atmosphere containing 0.5 atomic percent oxygen.

The samples were then subjected to a forming process, in which the films were melted once by an excimer laser. This was done at a pulse duration of 35 nanoseconds and an energy density of 30-40 millijoules per square centimeter.

The samples were then subjected to a crystallization-vitrification (erase-write) life test over 1 cm × 1 cm diameter cells. For these cycle tests, an excimer laser was used for vitrification (writing). The laser pulse was 30-40 millijoules/cm², for 35 nanoseconds.

After each "write" pulse, the samples were stored for 15-20 hours, and then "erased" by a xenon flash lamp. The flash lamp has an energy density of 0.5 Joule/cm² and a 50 microsecond flash duration. The "erased" samples were then examined by x-ray diffraction to determine the crystallite orientation.

The results shown in Tables I and II below, and in FIGS. 2A and 2B were obtained. The results show increasing anisotropic crystallite orientation with increasing nickel.

TABLE I

Ratio of Intensity of [100] Chalcogenide Crystallites to Intensity of [101] Chalcogenide Crystallites in $(Te_{89}Ge_5Sn_6)_{1-x}O_x$

| X | I [100] | I [101] | I [100]/I [101] |
|---|---------|---------|-----------------|
| 3 | 1 | 0.03 | 33.3 |
| 7 | 1 | 0.02 | 50 |
| 10 | 1 | — | infinite |

TABLE II

Ratio of Intensity of [100] Chalcogenide Crystallites to Intensity of [101] Chalcogenide Crystallites in $(Te_{89}Ge_2Sn_9)_{1-x}Ni_x$

| X | I [100] | I [101] | I [100]/I [101] |
|---|---------|---------|-----------------|
| 2 | 1 | 0.32 | 3.12 |
| 5 | 1 | 0.29 | 3.44 |
| 8 | 0.81 | 1 | 0.81 |

EXAMPLE II

A series of tests were carried out to determine the "written" and "erased" relative reflectivities for sputtered $Te_{88}Ge_2Sn_8Ni_2$, $Te_{88}Ge_2Sn_5Ni_5$ and $Te_{89}Ge_2Sn_9$ films.

The nickel containing samples were prepared by co-sputtering from Ni and $Te_{89}Ge_2Sn_9$ targets onto a 1 cm by 1 cm by 11 mil glass substrate in an argon atmosphere. The $Te_{89}Ge_2Sn_9$ samples were sputtered onto the targets in an argon atmosphere.

The samples were then tested in a state tester where a 1 micron by 1 micron cell was cycled repeatedly. A diode laser was used to cycle the cell with a 0.8 to 2.0 microsecond, 1.5 to 3.0 milliwatt erase pulse, and a 200 nanosecond, 8-10 milliwatt write pulse. The samples with nickel were erased with a 0.8 microsecond erase pulse. The sample without nickel required a 2.0 microsecond erase pulse.

FIG. 3 shows the relative reflectivities for the written and erased states of a $Te_{89}Sn_9Ge_2$ cell over 10,000 cycles. Erasing was with a 2 microsecond, 1.5 milliwatt pulse, and writing was with a 200 nanosecond, 10 milliwatt pulse. FIG. 4 shows the relative reflectivities for the written and erased states of a $Te_{88}Ge_2Sn_8Ni_2$ cell over 10,000 cycles. Erasing was with a 0.8 microsecond, 3 milliwatt pulse, and writing was with a 200 nanosecond, 8 milliwat pulse. FIG. 5 shows the relative reflectivities for the written and erased states of a $Te_{88}Ge_2Ni_5$ cell over 10,000 cycles. Erasing was with a 0.8 microsecond, 1.5 milliwatt pulse, and writing was with a 200 nanosecond, 8 milliwatt pulse.

FIG. 6 shows a 103° C. crystallization temperature for $Te_{89}Ge_2Sn_9$ as deposited, and a 98° C. crystallization temperature as vitrified. This is a five degree difference. FIG. 7 shows a 110° C. crystallization-temperature for $Te_{88}Ge_2Sn_8Ni_2$ as deposited, and a 99° C. crystallization temperature as vitrified. This is an eleven degree difference. FIG. 8 shows a 102° C. crystallization temperature for $Te_{88}Ge_2Sn_8Ni_5$ as deposited, and a 91° C. crystallization temperature as vitrified. This is also an eleven degree difference.

EXAMPLE III

A series of tests were carried out to determine the cycle life and erase time for $Te_{88}Ge_2Sn_8Ni_2$, $Te_{88}Ge_2Sn_5Ni_5$ and $Te_{89}Ge_2Sn_9$. The samples were prepared as described in Example I, and tested as described in Example II. The results shown below were obtained. The results of M. Chen, V. A. Rubin, V. Marrello, U. G. Gerber, and V. B. Jipson, "Reversibility and Stability of Tellurium Alloys For Optical Data Storage Applications", *Appl. Phys. Lett.* Vol. 46(8), pages 734–736 (Apr. 15, 1985), incorporated herein by reference, are shown for comparison:

| Sample | Phase | Cycles- | Erase Time u-sec | Tx (Deg C) Rcrded | Tx (Deg C) Dpsted |
|---|---|---|---|---|---|
| $Te_{89}Ge_2Sn_9$ (unencapsulated) | Amorphous | $>5 \times 10^5$ | 2.0 | 98 | 103 |
| $Te_{88}Ge_2Sn_8Ni_2$ (unencapsulated) | Amorphous | $>5 \times 10^5$ | 0.8 | 99 | 110 |
| $Te_{88}Ge_2Sn_5Ni_5$ (unencapsulated) | Amorphous | $>5 \times 10^5$ | 0.8 | 91 | 102 |
| $Te_{87}Ge_8Sn_5$ (encapsulated) (M. Chen et al) | Amorphous | $10^6$ | 30 | 73 | 105 |

While the invention has been described with respect to certain preferred embodiments and exemplifications, it is not intended to limit the scope of the invention thereby, but solely by the claims appended hereto.

What we claim is:

1. A data storage device having a layer of non-ablative chalcogen phase change data storage medium switchable between detectable states differing in local order by the application of projected beam energy thereto, the data storage medium comprising:
    (a) a chalcogen chosen from the group consisting of Te, Se, and mixtures thereof; and
    (b) a transition metal switching modulator chosen from the group consisting of Ni, Pd, Pt, and combinations thereof; the transition metal switching modulator increasing the switching speed and the switching sensitivity from the less ordered state to the more ordered state, increasing the signal to noise ratio, and increasing the randomness of orientation of crystallites of the more ordered state.

2. The data storage device of claim 1, wherein the transition metal switching modulator is present at a concentration sufficient to provide a substantially random orientation of crystallites evidenced by an intensity ratio for the crystallites, $I_{100}/I_{101}$, less then 50, and a fast crystallization time of less then 0.8 microseconds when measured with a 3 milliwatt pulse on a one square micron cell.

* * * * *